United States Patent
Roseman

(10) Patent No.: US 6,900,719 B2
(45) Date of Patent: May 31, 2005

(54) METHOD, DEVICE AND SYSTEM FOR PROVIDING ANTI-THEFT PROTECTION FOR ELECTRICAL DEVICES, PARTICULARLY CONTROLLERS IN VEHICLE REFUELING SYSTEMS

(75) Inventor: Yechiel Roseman, Ramat Gan (IL)

(73) Assignee: Roseman Engineering Ltd., Givataim (IL)

( * ) Notice: Subject to any disclaimer, the term of this patent is extended or adjusted under 35 U.S.C. 154(b) by 215 days.

(21) Appl. No.: 10/057,990

(22) Filed: Apr. 25, 2002

(65) Prior Publication Data

US 2003/0201872 A1 Oct. 30, 2003

(51) Int. Cl.[7] .......................... G08B 23/00; H04Q 9/00; H04L 9/14; G06F 7/00; E01B 9/06
(52) U.S. Cl. .................... 340/5.61; 340/5.22; 340/5.31; 340/5.72; 340/573.2; 411/439
(58) Field of Search ............................. 340/5.22, 5.31, 340/753.2, 5.72, 572.3, 550, 573.2; 411/439

(56) References Cited

U.S. PATENT DOCUMENTS

| | | | |
|---|---|---|---|
| 4,246,573 A | 1/1981 | Kiss | |
| 4,367,827 A | 1/1983 | Keller et al. | |
| 4,494,114 A | 1/1985 | Kaish | |
| 4,720,700 A | 1/1988 | Seibold et al. | |
| 4,987,406 A | 1/1991 | Reid | |
| 5,156,198 A | 10/1992 | Hall | |
| 5,406,261 A | 4/1995 | Glenn | |
| 5,671,786 A | 9/1997 | Corfitsen | |
| 5,936,526 A | 8/1999 | Klein | |
| 6,024,142 A | 2/2000 | Bates | |
| 6,078,256 A * | 6/2000 | Gottlieb | 340/542 |
| 6,116,298 A * | 9/2000 | Haimovich et al. | 141/94 |
| 6,285,076 B1 * | 9/2001 | Ando | 257/688 |
| 6,326,686 B1 * | 12/2001 | Baek et al. | 257/712 |
| 6,402,354 B1 * | 6/2002 | Tatewaki et al. | 362/490 |

* cited by examiner

Primary Examiner—Michael Horabik
Assistant Examiner—Kimberly Jenkins
(74) Attorney, Agent, or Firm—G.E. Ehrlich (1995) Ltd.

(57) ABSTRACT

A method and device for providing anti-theft protection for an electrical device installed on a body, such as a vehicle, by fixing to the body an electrical chip having a unique identification number identifying the body, electrically connecting the electrical device to the electrical chip in a manner such that removal of the electrical device from the body automatically interrupts the electrical connection of the electrical device to the electrical chip, and disabling the operation of the electrical device whenever its electrical connection to the chip is interrupted.

14 Claims, 4 Drawing Sheets

METHOD, DEVICE AND SYSTEM FOR PROVIDING ANTI-THEFT PROTECTION FOR ELECTRICAL DEVICES, PARTICULARLY CONTROLLERS IN VEHICLE REFUELING SYSTEMS

FIELD AND BACKGROUND OF THE INVENTION

The present invention relates to a method, and also to a device and system for use with such method, for providing anti-theft protection for electrical devices installed on various types of bodies. The invention is particularly useful for providing anti-theft protection for vehicle refueling controllers installed on vehicles, and is therefore described below particularly with respect to this application, but it will be appreciated that the invention could be used in many other applications, for example, for providing anti-theft protection of radios, tape recorders, or other electrical devices from vehicles, homes, or other locations where such electrical devices are installed.

Apparatus for automatically refueling vehicles is gaining widespread use because of their convenience and cost savings, both in the refueling of the vehicles, and also in the monitoring of fuel expenses and other information regarding the respective vehicles. Such automatic refueling apparatus generally includes a control system at the refueling station effective, upon the insertion of a nozzle into the fuel tank opening of a vehicle, to control the respective pump at the fuel station to dispense fuel into the fuel tank opening of the vehicle, and to record the amount of fuel dispensed as well as the identification of the respective vehicle and respective nozzle.

Examples of systems of this type are described in U.S. Pat. Nos. 4,367,827; 5,156,198; 5,671,786; and 6,024,142.

A drawback in the conventional systems is that, if the controller is stolen, it can be used to obtain fuel in a similar that a stolen credit card can be used for obtaining credit. Therefore, it would be highly desirable to provide anti-theft protection of the controller in such automatic refueling systems.

The need to provide anti-theft protection of other electrical devices, such as vehicle radios, tape recorders, and the like, is also well recognized, and various solutions have been proposed, as described for example in U.S. Pat. Nos. 4,246,573; 4,494,114; 4,720,700; 4,987,406; 5,406,261; and 5,936,526. However, apparently none of these previously proposed devices has gained widespread use.

OBJECTS AND BRIEF SUMMARY OF THE PRESENT INVENTION

An object of the present invention is to provide a novel method of anti-theft protection for electrical devices in general, which method has a number of important advantages as will be described more particularly below. Another object is to provide a method of anti-theft protection particularly useful for protecting controllers of vehicle refueling systems installed in vehicles. Further objects are to provide a device, and also a system, for anti-theft protection in accordance with the foregoing method.

According to one aspect, the present invention involves a method of providing anti-theft protection for an electrical device installed on a body, comprising the steps: (a) fixing to the body an electrical chip having a unique identification number identifying the body wherein said electrical chip is housed within a plug, and irremovably inserting said into a bore in said body; (b) electrically connecting the electrical device to the electrical chip in a manner such that removal of the electrical device from the body automatically interrupts the electrical connection of the electrical device to the electrical chip; (c) and automatically disabling the operation of the electrical device whenever its electrical connection to the chip is interrupted by the removal of the electrical device from the body such that the electrical device is enabled only while on the body identified by the unique identification number.

According to further features in the preferred embodiment of the invention described below, step (c) is performed by providing the electrical device with a microprocessor, and programming the microprocessor to read the unique identification number of the electrical chip fixed to the body to enable operation of the electrical device.

According to another aspect, the invention involves a method of providing anti-theft protection for a controller of a vehicle refueling system installed on a vehicle, comprising the steps wherein said electrical chip is housed within a plug, and irremovably inserting said plug into a bore in said body: (a) fixing to the vehicle an electrical chip having a unique identification number identifying the vehicle; (b) electrically connecting the controller to the electrical chip in a manner such that removal of the controller from the vehicle automatically interrupts the electrical connection of the controller to the electrical chip; (c) and automatically disabling the operation of the controller whenever its electrical connection to the chip is interrupted by the removal of the controller from the vehicle such that the controller is enabled only while on the vehicle identified by the unique identification number.

According to a still further aspect the invention, involves a protection device to provide anti-theft protection for an electrical device installed on a body, comprising: a housing attachable to the body; an electrical chip housed within the housing and programmable with a unique identification number for identifying the body; electrical connections from the electrical chip within the housing for connection to the electrical device to be protected, the electrical connections being automatically interrupted upon removal of the electrical device from the body; and a microprocessor programmed to read the unique identification number of the electrical chip and to disable operation of the electrical device upon failure to read the unique identification number; wherein the housing is in the form of a plug including a stem at one end for insertion into a bore formed in the body, and an enlarged head at the opposite end to be located outwardly of the bore, the stem carrying the electrical chip and the electrical connections from the chip to the juncture of the stem with its enlarged head, so as to facilitate connection of the electrical connections to the electrical device.

As will be described more particularly below, the method and device of the present invention are particularly, but not exclusively, useful in providing protection against theft of controllers installed in vehicles for use in vehicle refueling systems, since a stolen controller is completely useless to the thief. The same of course applies to other electrical devices, such as radios, tape recorders, and the like, which may be stolen particularly from vehicles.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
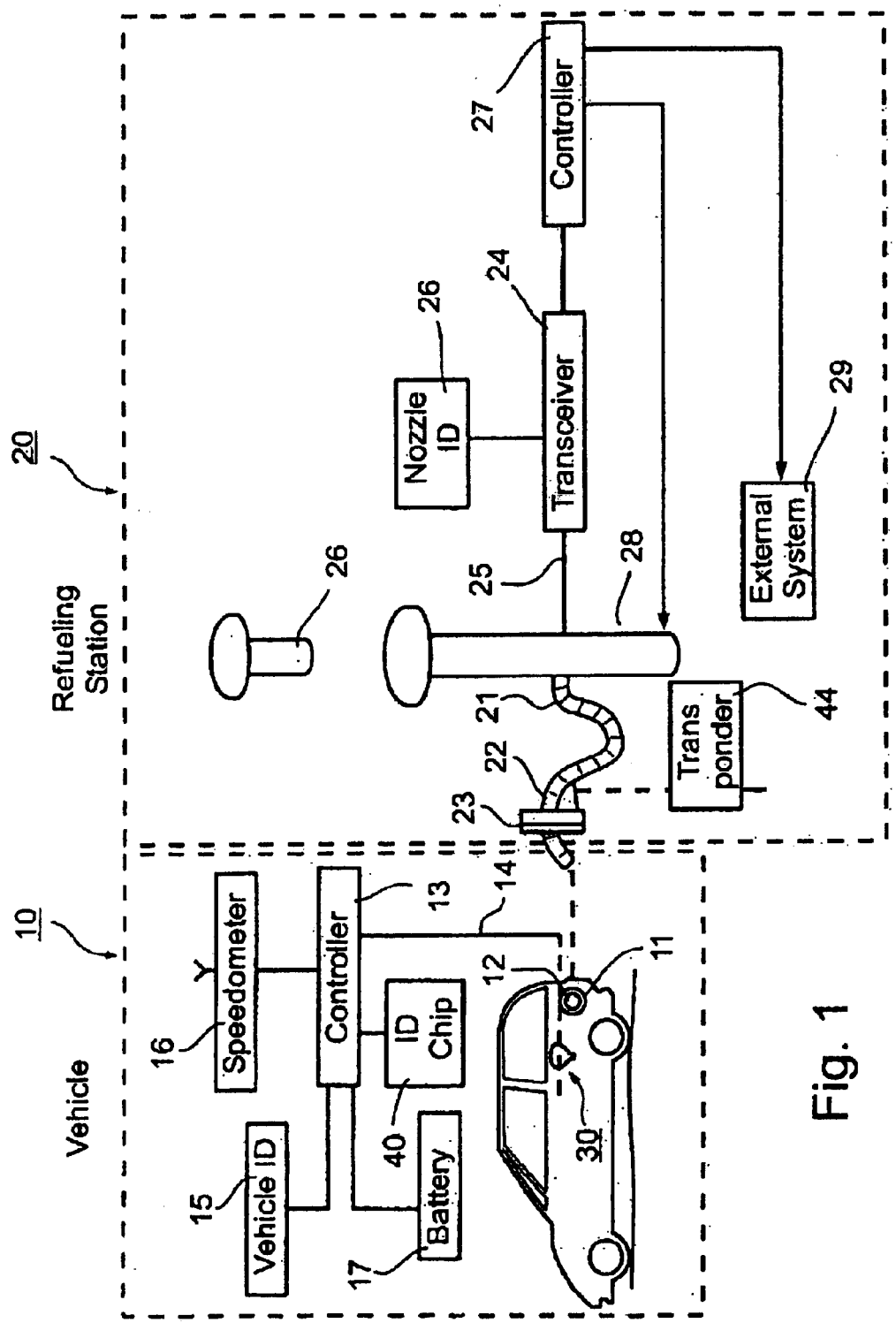
FIG. 1 is block diagram illustrating one form of vehicle refueling system including anti-theft protection in accordance with the present invention for the controller installed in the vehicle.

The invention of the present application is particularly useful in a vehicle refueling system, such as illustrated in FIG. 1, and is therefore described below particularly with respect to such a system.

Vehicle Refueling System (FIG. 1)

FIG. 1 illustrates one form of prior art apparatus for automatically refueling vehicles but modified in accordance with the present invention. In FIG. 1, the vehicle is diagrammatically indicated by the box 10 and the refueling station is diagrammatically indicated by block 20. As shown in FIG. 1, the vehicle has a fuel tank opening shown at 11 adapted to receive the nozzle of a fuel pump hose at the refueling station 20. The vehicle carries a coil 12 around the fuel tank opening 11, and a controller 13 connected by an electrical cable 14 to the coil 12. The vehicle 10 further includes a storage device 15 for electrically storing the identification of the vehicle, which storage device is a part of, or inputted into, the controller 13. The vehicle speedometer 16 provides another input into the vehicle controller 13. The controller, and the other electrical devices within the vehicle, are powered by the vehicle battery 17.

The refueling station, diagrammatically indicated by block 20, includes a plurality of pumps, each having a dispensing hose, schematically shown at 21, terminating in a nozzle 22 for insertion into the fuel tank opening 11 of a vehicle to be refueled. Each nozzle 22 includes a coil 23 which, when the nozzle is inserted into the fuel tank opening of the vehicle, becomes inductively coupled to coil 12 carried by the vehicle fuel tank opening 11. Upon the insertion of a nozzle 22 into the fuel tank opening of the vehicle, an inductive coupling is effected whereby the controller 13 of the vehicle transmits the vehicle identification, mileage, and other data that may be desired, via coils 12 and 23, to a receiver 24 at the refueling station. The transmission of this information is effected via the space link between the two coils 12, 23, and a wire link 25 between coil 23 and the receiver 24 in the refueling station. Each nozzle 22 is identified by a nozzle identification storage device 26 which identification is also supplied to the receiver 24 via the nozzle coil 23 and wire link 25. The information is received by receiver 24 via wire link 25 and is fed to a controller 27 at the refueling station. Controller 27 controls the operation of the pumps, schematically shown at 28. Controller 27 may also be connected to an external system 29, such as a data processor system, for processing the data and for producing reports concerning the quantities of fuel received by the vehicle, the mileage of the vehicle, etc., to enable tracking fuel expenses and maintenance costs.

As indicated earlier, a drawback of such a vehicle refueling system is the ease in which the electrical controller can be stolen and thereafter used, much as a stolen credit card, for obtaining fuel illegitimately. The system illustrated in FIG. 1 has therefore been modified in accordance with the present invention to provide anti-theft protection with respect to the controller 13.

The anti-theft protection device installed on the vehicle to protect the controller against theft is diagrammatically indicated at 30 in FIG. 1, and is described more particularly below in FIGS. 2–7. The electrical circuit for disabling the operation of controller 13 in the event of its removal from the vehicle is schematically indicated by block 40 in FIG. 1, and is more particularly described below in FIG. 8.

Anti-Theft Protection Device (FIGS. 2–8)

Figure 2:
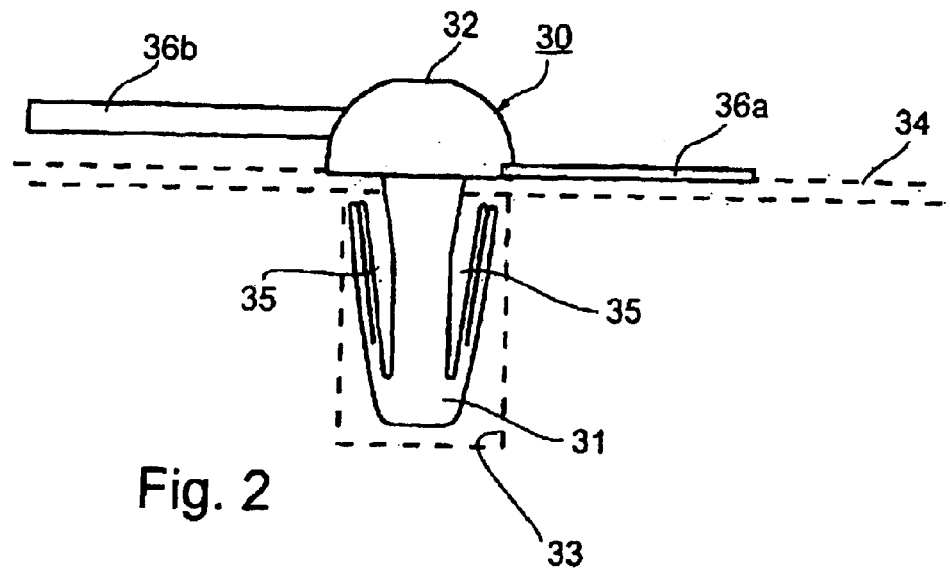
FIG. 2 illustrates one form of anti-theft protection device constructed in accordance with the invention for use in the system of FIG. 1.

As shown particularly in FIG. 2, the anti-theft protection device, indicated at 30 in FIG. 1, is in the form of a plug having a stem 31 formed with an enlarged head 32. The plug is adapted to be inserted into a bore, shown schematically at 33 in FIG. 2, formed in a wall 34 of any part of the vehicle body, such as in the vehicle trunk.

Plug 30 is to be irremovably inserted into bore 33 of the vehicle body. For this purpose, the stem 31 is provided with a pair of expansible wings 35 integrally hinged at one end to the tip of stem 31 to permit the stem to be inserted into bore 33 of the vehicle body, but once the stem is so inserted, the expansible wings 35 expand to prevent removal of the plug from the vehicle body.

As shown in FIG. 2, when the plug is so inserted into a wall 34 of the vehicle body, its head 32 remains externally of the wall. The electrical terminals, shown at 36a and 36b, are also externally located to permit them to be electrically connected to the controller 13, or other electrical device to be protected against theft.

Figure 3:
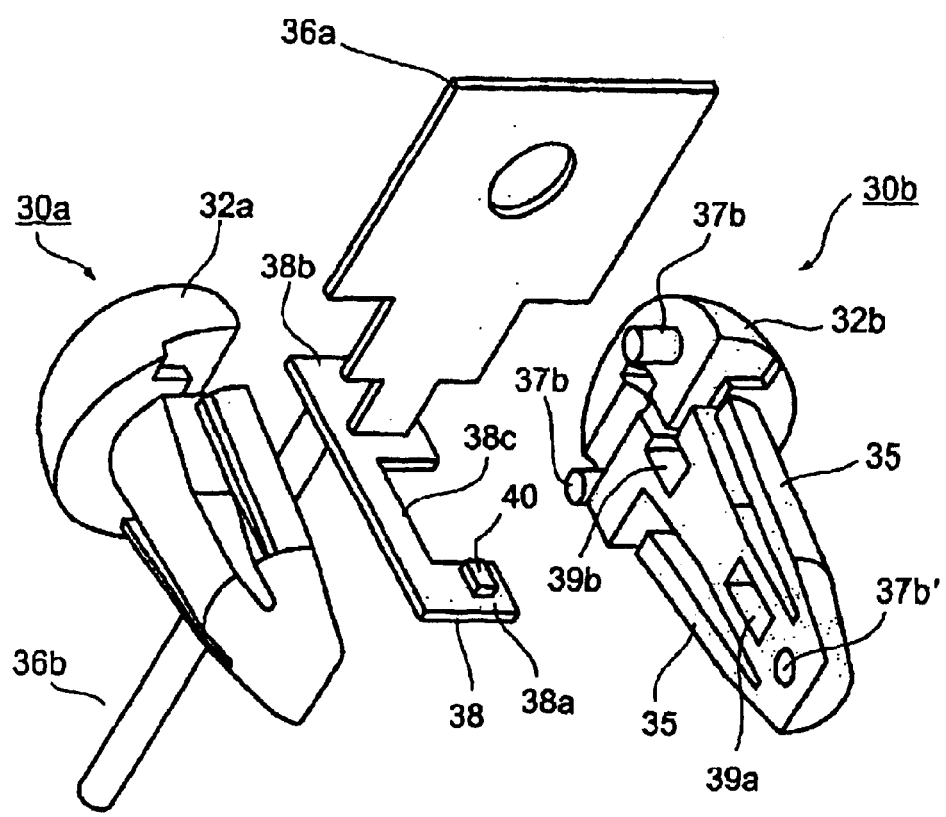
FIGS. 3 and 4 are exploded perspective views, from different viewing points, of the anti-theft protection device illustrated in FIG. 2.
Figure 4:
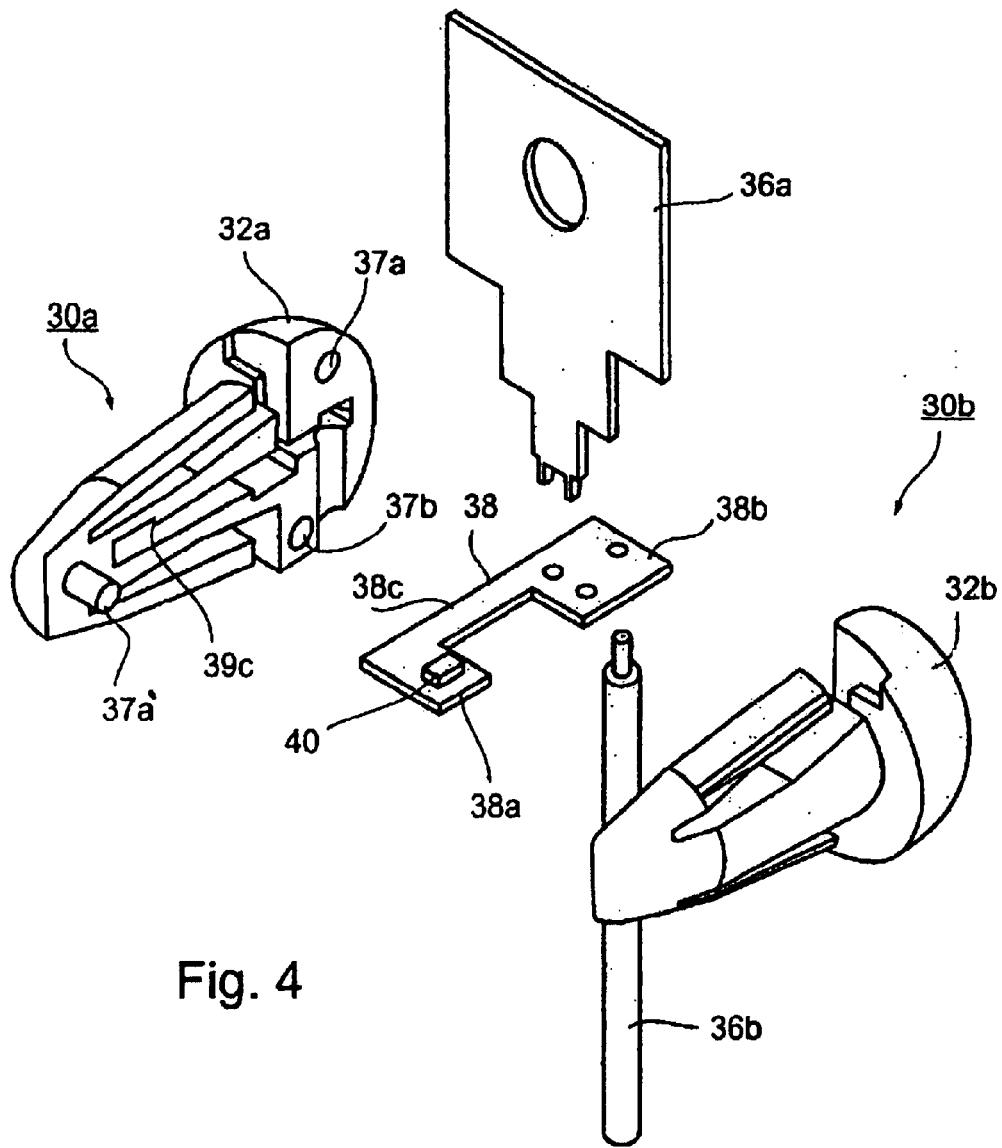
Figure 5:
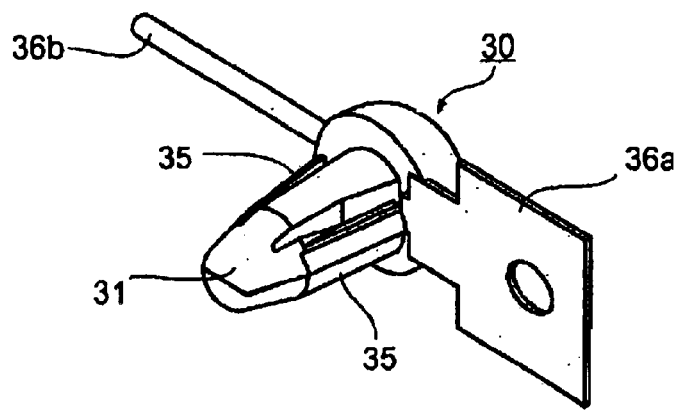
FIG. 5 is a perspective view illustrating the device of FIGS. 2–4 when assembled.
Figure 6:
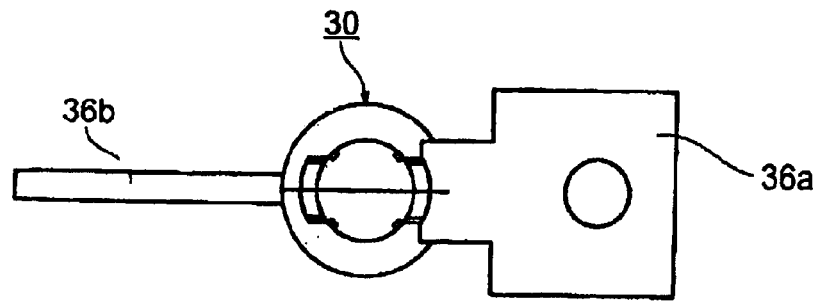
FIG. 6 is a top plan view illustrating the device of FIGS. 2–5.
Figure 7:
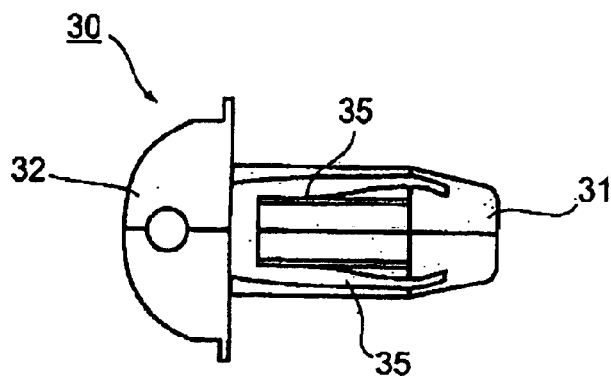
FIG. 7 is a side elevational view illustrating the device of FIGS. 2–5.

As shown particularly in FIGS. 3 and 4, plug 30 is constituted of two sections, shown at 30a, 30b, to be assembled together with a press-fit. Thus, plug section 30a includes two bores 37a (FIG. 4) in the enlarged head of its section, and a pin 37a' at the tip of its stem section; whereas plug section 30b includes two pins 37b (FIG. 3) in its head section, and a bore 37b' at the tip of its stem section, thereby permitting the two sections to be fixed together by a press fit of their respective pins in the respective bores.

Housed within plug 30 is a printed-circuit strip 38 of U-configuration, including a first leg 38a, and a second leg 38b joined thereto by a thin juncture section 38c. As shown particularly in FIG. 3, plug section 30b is formed with a pair of recesses 39a, 39b, for receiving legs 38a, 38b of the printed-circuit strip 38; whereas the other plug section 30a is formed with a recess 39c (FIG. 4) for receiving the thin juncture section 38c of the printed-circuit strip 38.

Leg section 38a of the printed-circuit strip 38 carries a chip 40 having, or programmable to receive, a unique identification number identifying the respective vehicle 10 (FIG. 1). Leg 38b of the printed-circuit strip 38 includes terminal 36a to be electrically connected to the ground, and terminal 36b to be connected to the electrical device to be protected, namely controller 13 in FIG. 1.

It will thus be seen that the identification chip 40, including the electrical connections to its terminal 36a, 36b, may be assembled by merely inserting the printed-circuit strip 38 in the respective recesses 39a, 39b, 39c of the two plug sections 30b, 30a, respectively, and then press-fitting the two sections together via their pins and bores 37a–37c.

It will also be seen that the plug 30 may then be press-fitted into bore 33 of the vehicle body 34, whereupon the expansion wings 35 in the housing will expand and thereby prevent removal of the plug from the vehicle body. When the plug is so mounted irremovably in the vehicle body, its two terminals 36a, 36b are exposed for connection of terminal 36a to ground, and terminal 36b to the controller to be protected, namely controller 13 in FIG. 1.

Figure 8:
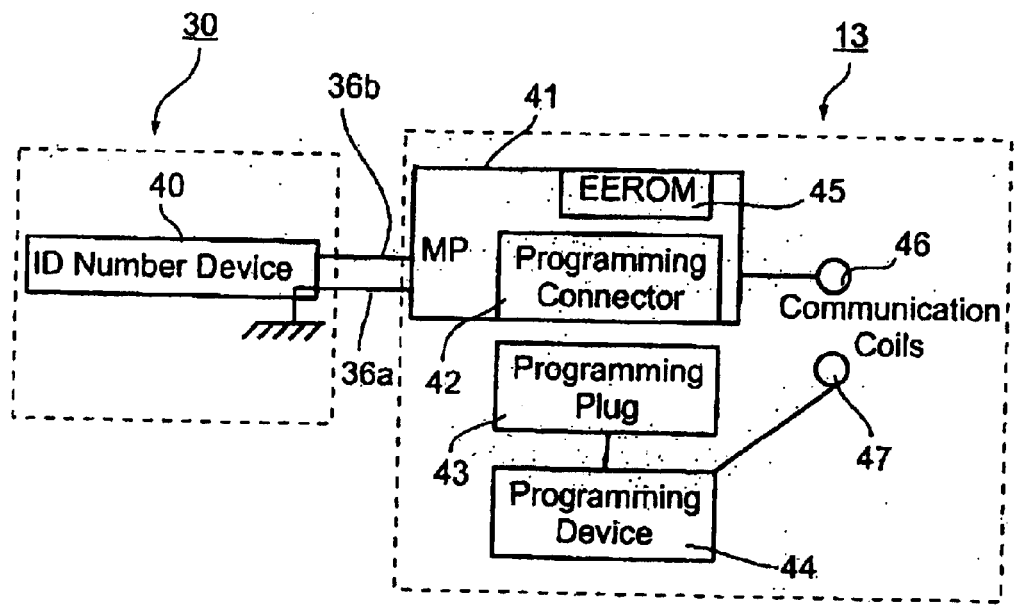
FIG. 8 is a block diagram illustrating the electrical circuit for disabling the controller in the vehicle refueling system upon removal of the controller from the vehicle.

FIG. 8 illustrates the electrical circuit including the identification chip 40 within plug 30, and the controller 13. Controller 13 includes a microprocessor 41 controlling the controller 13 to perform its normal functions in a refueling system. In this case, microprocessor 41 also includes a programming connector 42 connectable to a programming plug 43 of a programming device 44 for programming the microprocessor to read the unique identification number in the identification chip 40 to store it in a memory device 45.

The programming device is a technician tool used only for the initial programming of the vehicle controller. The programming device can be connected to the vehicle controller via 42, 43; alternatively, it can program the vehicle controller via the communication coils 46–47.

Operation

The operation of the apparatus illustrated in FIG. 1 is as follows: A vehicle to be refueled is driven to the region of a fuel hose 21 at the refueling station 20, and the hose nozzle 22 is inserted into the fuel tank opening 11 of the vehicle. The vehicle continuously, or at least when not moving, transmits its vehicle identification, gasoline type, and possibly other pertinent information via its coil 12. Upon the insertion of the nozzle into the vehicle fuel tank opening 11, coil 12 on the fuel tank opening 11 becomes inductively coupled to coil 23 on the fuel nozzle 22, whereupon communication is initiated between the controller 13 of the vehicle and the receiver 24 in the refueling station. This communication can be unidirectional, wherein the vehicle controller 13 transmits information via coils 12 and 23 to the receiver 24 in the refueling station. Alternatively, the communication can be bi-directional, in which case receiver 24 would be a transceiver, enabling it to transmit information from the refueling station 20 via coils 23 and 12 to the vehicle controller 13.

The information transmitted by the vehicle controller 13 to the receiver (or transceiver) 24, would include the vehicle identification, the odometer reading, the type of fuel needed by the vehicle, limitations on refueling (e.g., maximum quantity), etc. The receiver 24 also receives the identification of the respective nozzle 22 inserted into the vehicle fuel tank opening 11 as stored in the nozzle identification storage device 26.

All the foregoing information is transferred by receiver 24 to controller 27 in the refueling station. Controller 27 checks the foregoing information and, if it is in order, actuates the respective pump 28 to dispense the fuel through the respective nozzle into the vehicle tank. This refueling operation is continuously monitored by controller 27 so that if the nozzle is removed, or moved to another vehicle, the dispensing of the fuel will be immediately suspended. At the end of a refueling operation, the nozzle is returned to its holder on the pump.

During each refueling operation, the controller 27 records the amount of fuel dispensed, the identification of the vehicle, the identification of the nozzle, the identification of the pump, and any other desired information. This enables the controller to produce a record of all relevant information, including date, time, vehicle information, refuel details, etc., which information is fed to an external system, as shown by block 29, for billing, control reports, etc.

If the receiver 24 in the refueling station is actually a transceiver, some of this information can be transmitted via controller 27 back to the vehicle controller 13 via the inductive link produced by the two coils 23 and 12.

When the identification chip 40 has been installed as described above in a particular vehicle, it is connected, via programming connector 42 in microprocessor 41 of the controller 13, and a programming plug 43, to a programming device 44 to program the information inputted into the controller for the particular vehicle, such as the plate number, type of fuel, refueling restrictions, etc. In addition, the programming device 44 also triggers the vehicle controller to read the unique identification number in the identification chip 40 for the particular vehicle and stores that identification number also in the storage device 45. Thereafter, the vehicle identification number stored in the identification chip 40 is periodically read and compared with the stored identification number in the storage device 45.

Thereafter, the vehicle identification number stored in the identification chip 40 is periodically read and stored in the storage device 45. This rereading and comparing of the identification number is done periodically, and if the proper identification number is not found to be present, this will disable the operation of the controller.

Accordingly, if the controller 13 is removed from the vehicle, this will break the electrical connections 36a, 36b to the identification chip 40, thereby precluding its unique identification number to be read into the storage device 45 of the microprocessor 41 in the controller 13, and thereby disabling the operation of the controller.

Programming of the identification chip 40 with the unique identification number can be done only once, e.g., by the manufacturer. Accordingly, the identification chip 40 cannot be reprogrammed with another identification number to enable it to permit operation of a controller which has been removed from the original vehicle containing the original identification chip.

While the invention has been described with respect to a controller for a vehicle refueling system, it will be appreciated that the invention could also be used for protecting other electrical devices, such as vehicle radios, tape recorders, or the like. It will also be appreciated that the electrical device, such as a vehicle radio, can be equipped with connectors to permit the user to remove the electrical device from the vehicle, and then to reapply it to the same vehicle. If such a removed electrical device is applied to another vehicle, other than the one carrying the identification chip 40 of the original identification number programmed for that particular electrical device, the electrical device will be disabled from operation.

While the invention has been described above with respect to one particular application, namely in a vehicle refueling system, it will be appreciated that the invention could be used in many other applications, such as for protecting vehicle radios, against theft, and that many other variations, modifications and applications of the invention will be apparent.

What is claimed is:

1. A method of providing anti-theft protection for an electrical device installed on a body, comprising the steps:

(a) fixing to said body an electrical chip having a unique identification number identifying said body wherein said electrical chip is housed within a plug, and irremovably inserting said plug into a bore in said body;

(b) electrically connecting said electrical device to said electrical chip in a manner such that removal of the electrical device from said body automatically interrupts the electrical connection of the electrical device to the electrical chip;

(c) and automatically disabling the operation of said electrical device whenever its electrical connection to said chip is interrupted by the removal of said electrical device from said body such that said electrical device is enabled only while on said body identified by said unique identification number.

2. The method according to claim 1, wherein step (c) is performed by providing the electrical device with a microprocessor, and programming said microprocessor to read the unique identification number of said electrical chip fixed to said body to enable operation of said electrical device.

3. The method according to claim 1, wherein said body is an automotive vehicle.

4. The method according to claim 1, wherein said electrical device is a controller of a vehicle refueling system installed in a vehicle.

5. A method of providing anti-theft protection for a controller of a vehicle refueling system installed on a vehicle, comprising the steps:

(a) fixing to said vehicle an electrical chip having a unique identification number identifying said vehicle wherein said electrical chip is housed within a plug, and irremovably inserting said plug into a bore in said body;

(b) electrically connecting said controller to said electrical chip in a manner such that removal of the controller from said vehicle automatically interrupts the electrical connection of the controller to the electrical chip;

(c) and automatically disabling the operation of said controller whenever its electrical connection to said chip is interrupted by the removal of said controller from said vehicle such that said controller is enabled only while on said vehicle identified by said unique identification number.

6. The method according to claim 4, wherein step (c) is performed by providing the said controller with a microprocessor, and programming said microprocessor to read the unique identification number of said electrical chip fixed to said vehicle to enable operation of said controller.

7. A protection device to provide anti-theft protection for an electrical device installed on a body, comprising:

a housing attachable to said body;

an electrical chip housed within said housing and programmable with a unique identification number for identifying said body; and electrical connections from said electrical chip within said housing for connection to said electrical device to be protected, said electrical connections being automatically interrupted upon removal of the electrical device from the body;

wherein said housing is in the form of a plug including a stem at one end for insertion into a bore formed in said body, and an enlarged head at the opposite end to be located outwardly of said bore;

said stem carrying said electrical chip and said electrical connections from the chip to the juncture of said stem with its enlarged head, so as to facilitate connection of the electrical connections to said electrical device.

8. The protection device according to claim 7, wherein said plug includes a pair of expansion elements integrally hinged at one end to the tip of said stem, such that the expansion elements contract upon insertion of the stem into the bore, and thereupon expand to prevent removal of the stem from the bore.

9. The protection device according to claim 7, wherein said plug includes two sections, one section being formed with at least one pin, and the other section being formed with at least one bore for receiving said pin with a press fit.

10. The protection device according to claim 9, wherein said electrical chip is mounted on a printed circuit strip including a first section carrying said electrical chip, a second section having said electrical connections, and a juncture section joining said first and second sections.

11. The protection device according to claim 10, wherein said printed circuit strip is of U-configuration, including first and second leg sections joined by a narrow juncture section.

12. The protection device according to claim 11, wherein one section of said housing is formed with a pair of spaced recesses for receiving each of said leg sections of the printed circuit strip, and the other section of said housing is formed with a narrow recess for receiving said juncture section of the printed circuit strip.

13. A protection system including a protection device in accordance with claim 7, combination with an electrical device to be protected, said electrical device to be protected including a microprocessor programmed to read said unique identification number to enable operation of said electrical device.

14. The system according to claim 13, wherein said electrical device to be protected is a controller of a vehicle refueling system installed in a vehicle.

* * * * *

UNITED STATES PATENT AND TRADEMARK OFFICE
CERTIFICATE OF CORRECTION

PATENT NO.    : 6,900,719 B2
DATED         : May 31, 2005
INVENTOR(S)   : Yechiel Roseman It is certified that error appears in the above-identified patent and that said Letters Patent is hereby corrected as shown below:

<u>Title page,</u>
Item [22], PCT Filed, should read as follows:
-- [22] Filed: Jan. 29, 2002 --.

Signed and Sealed this

Nineteenth Day of July, 2005

JON W. DUDAS
*Director of the United States Patent and Trademark Office*